July 6, 1926.  1,591,888
W. ROSSOW
ANIMAL WHIPPING DEVICE
Filed March 18, 1926
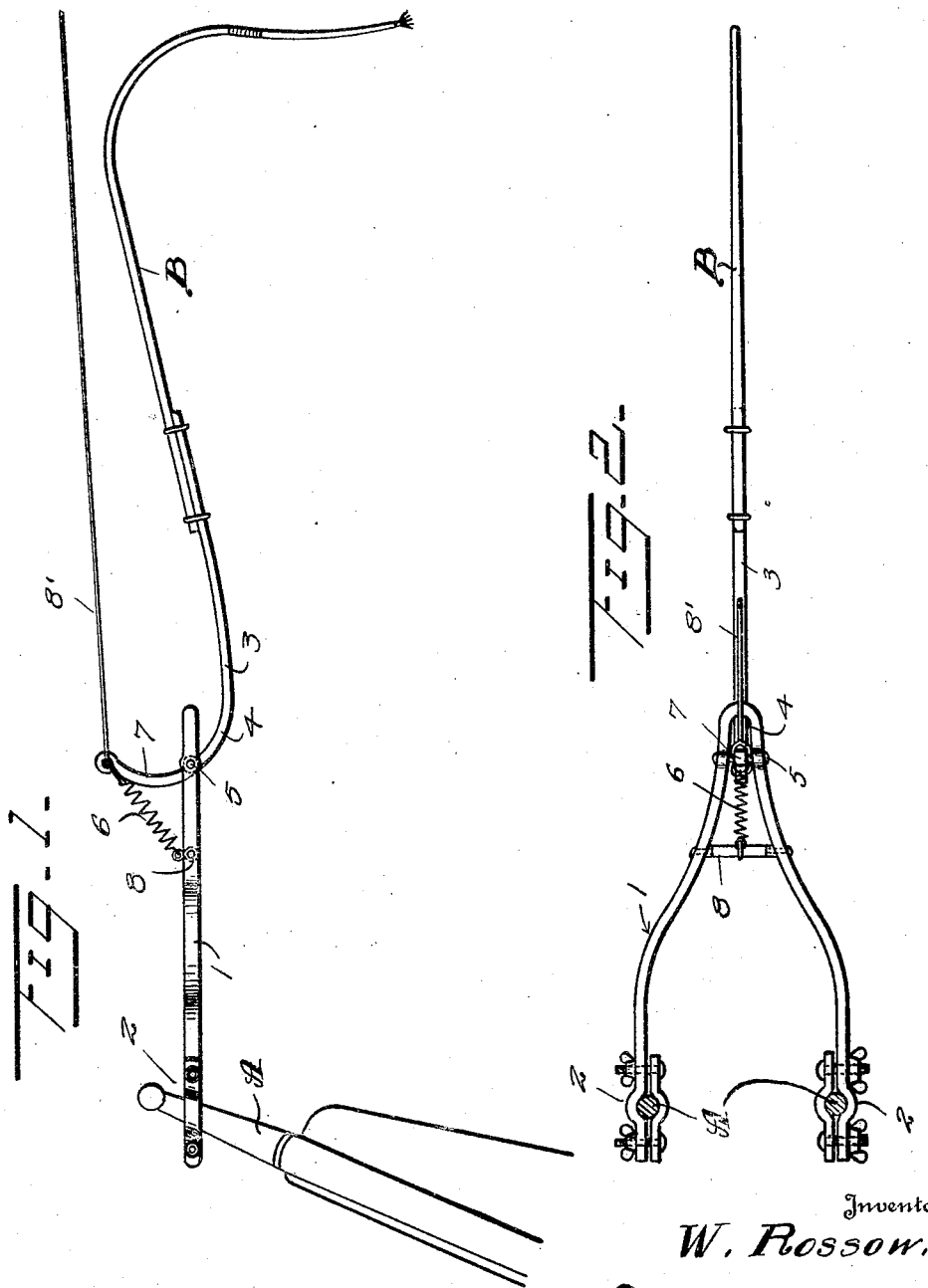
Inventor
W. Rossow,
By  Attorney Patented July 6, 1926.

1,591,888

UNITED STATES PATENT OFFICE.

WALTER ROSSOW, OF CEDAR RAPIDS, NEBRASKA.

ANIMAL-WHIPPING DEVICE.

Application filed March 18, 1926. Serial No. 95,760.

The invention relates to means for whipping draft animals and particularly to means carried by the lead animal or animals of a team to enable the driver to urge the lead animal, and has for its object the provision of means adapted to be mounted on the hames of the harness of the animal to be urged by which a whip is pivotally carried and normally held in a raised position resiliently, and providing means by which the whip may be lowered to strike the animal against the resistance of the spring.

The invention will be described in detail hereinafter and will be found illustrated in the accompanying drawings, in which—

Figure 1 is a side view of the device showing it attached to the hames of an animal's harness, and Figure 2 a top plan view of the device unattached.

In the drawings similar reference characters will be used to designate corresponding parts in both views.

The improved whipping device comprises a V-shaped yoke member 1 having a clamp 2 on the end of each of the arms of the yoke that is adapted to be secured to the hames A of the animal's harness, as shown in Figure 1 of the drawings. 3 indicates an arm to which a whip B is adapted to be secured in any well known manner at one end of the arm, while the other end of the arm 3 is curved upwardly as shown at 4 and pivotally secured between the arms of the yoke 1 as shown at 5. A spring 6 is secured at one of its ends to the upper end 7 of the curved portion 4, and is secured at its other end to a cross bar 8 connecting the arms of the V-shaped yoke 1. Spring 6 functions to normally hold the arm 3 in position so that the whip B is in a raised position, and 8 indicates a rope or other suitable flexible member secured to the upper extremity of the end 7 of the arm 3 and is adapted to be actuated by the driver of the vehicle to swing the arm 3 to move the whip B into a whipping position.

It will be understood that in use the device enables the driver of the vehicle to urge the animal to which the device is secured without urging the other animals, it being understood that one of the devices is to be attached to each animal that requires urging.

What is claimed is:—

1. A whipping device for draft animals, comprising a V-shaped member adapted to be secured to the harness hames of an animal, an arm pivotally secured to said member and adapted to carry a whip secured to one of its extremities, the other extremity of said arm provided with an upwardly offset portion, a spring connecting said offset portion and the V-shaped member to normally hold the whip in a raised position, and manually actuated means engaging said offset portion to move the whip into whipping position.

2. A whipping device for draft animals, comprising a V-shaped yoke adapted to be secured to the harness hames of an animal, an arm adapted to carry a whip at one of its extremities, the other end of said arm being upwardly curved, said curved portion being pivotally secured between the arms of said yoke, a spring connecting said curved portion and the yoke to normally hold the whip in a raised position, and a flexible element adapted for manual operation secured to the extremity of said curved portion to move the whip into whipping position.

In testimony whereof I affix my signature.

WALTER ROSSOW.